United States Patent
Kim et al.

(10) Patent No.: US 8,526,445 B2
(45) Date of Patent: Sep. 3, 2013

(54) APPARATUS AND METHOD FOR PROVIDING DOMAIN INFORMATION

(75) Inventors: Hyoung-shick Kim, Seoul (KR); Sang-hyeon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 11/829,538

(22) Filed: Jul. 27, 2007

(65) Prior Publication Data

US 2008/0075091 A1 Mar. 27, 2008

Related U.S. Application Data

(60) Provisional application No. 60/846,105, filed on Sep. 21, 2006.

(30) Foreign Application Priority Data

Jan. 31, 2007 (KR) ........................ 10-2007-0010269

(51) Int. Cl.
*H04L 12/28* (2006.01)
*H04L 12/56* (2006.01)
*G06F 7/04* (2006.01)
*G06F 15/16* (2006.01)

(52) U.S. Cl.
USPC .............. 370/400; 370/395; 709/206; 726/26

(58) Field of Classification Search
USPC ................. 370/235–254, 310–354, 395–410; 709/206–238; 713/182–201; 726/2–26
See application file for complete search history.

(56) References Cited

U.S. PATENT DOCUMENTS

| | | | |
|---|---|---|---|
| 5,664,170 A | 9/1997 | Taylor | |
| 5,931,900 A * | 8/1999 | Notani et al. | 709/201 |
| 5,995,945 A * | 11/1999 | Notani et al. | 705/28 |
| 6,282,577 B1 | 8/2001 | Okanoue et al. | |
| 6,332,130 B1 * | 12/2001 | Notani et al. | 705/28 |
| 7,076,541 B1 | 7/2006 | Burstein et al. | |
| 7,194,554 B1 | 3/2007 | Short et al. | |
| 7,389,273 B2 | 6/2008 | Irwin et al. | |
| 7,395,393 B2 | 7/2008 | Shiraki et al. | |
| 7,414,996 B2 | 8/2008 | Fan | |
| 7,512,081 B2 | 3/2009 | Ayyagari et al. | |
| 2002/0099809 A1 * | 7/2002 | Lee | 709/223 |

(Continued)

FOREIGN PATENT DOCUMENTS

| | | |
|---|---|---|
| CN | 1656803 A | 8/2005 |
| CN | 1714529 A | 12/2005 |

(Continued)

OTHER PUBLICATIONS

Office Action dated Oct. 19, 2010 from the Japanese Patent Office in counterpart Japanese application No. 2009-529112.

(Continued)

*Primary Examiner* — Man Phan
(74) *Attorney, Agent, or Firm* — Sughrue Mion, PLLC

(57) ABSTRACT

An apparatus for providing domain information is disclosed. The apparatus includes a storage module that stores domain information regarding a domain, and a control module that transmits a response message including the stored domain information to the device through the communication-interface module in response to a domain-information-request message received from the device.

18 Claims, 5 Drawing Sheets

(56) References Cited

U.S. PATENT DOCUMENTS

| | | | |
|---|---|---|---|
| 2002/0157002 A1* | 10/2002 | Messerges et al. | 713/155 |
| 2003/0200335 A1 | 10/2003 | Choi et al. | |
| 2004/0030800 A1 | 2/2004 | Gray et al. | |
| 2004/0039798 A1 | 2/2004 | Hotz et al. | |
| 2004/0103312 A1* | 5/2004 | Messerges et al. | 713/201 |
| 2005/0071279 A1 | 3/2005 | Asano | |
| 2005/0075115 A1 | 4/2005 | Corneille et al. | |
| 2005/0086532 A1 | 4/2005 | Lotspiech et al. | |
| 2005/0102513 A1 | 5/2005 | Alve | |
| 2005/0120216 A1 | 6/2005 | Lee et al. | |
| 2005/0182727 A1* | 8/2005 | Robert et al. | 705/51 |
| 2005/0182856 A1 | 8/2005 | McKnett | |
| 2005/0193199 A1 | 9/2005 | Asokan et al. | |
| 2005/0198224 A1 | 9/2005 | Kobayashi et al. | |
| 2005/0210261 A1* | 9/2005 | Kamperman et al. | 713/182 |
| 2005/0213566 A1 | 9/2005 | Jutila et al. | |
| 2006/0002308 A1* | 1/2006 | Na et al. | 370/252 |
| 2006/0109850 A1 | 5/2006 | Otani et al. | |
| 2006/0129678 A1* | 6/2006 | Morita | 709/227 |
| 2006/0187858 A1 | 8/2006 | Kenichi et al. | |
| 2006/0200571 A1 | 9/2006 | Backman | |
| 2006/0206920 A1 | 9/2006 | Kim et al. | |
| 2007/0156918 A1 | 7/2007 | Philyaw | |
| 2007/0169203 A1* | 7/2007 | Kim et al. | 726/26 |
| 2007/0201690 A1* | 8/2007 | Kim | 380/28 |
| 2007/0226811 A1* | 9/2007 | Kamperman et al. | 726/30 |
| 2007/0242821 A1 | 10/2007 | Kim et al. | |
| 2008/0046985 A1* | 2/2008 | Lenoir et al. | 726/6 |
| 2008/0072301 A1* | 3/2008 | Chia et al. | 726/8 |
| 2008/0134309 A1* | 6/2008 | Qin et al. | 726/6 |
| 2008/0229387 A1* | 9/2008 | Baks et al. | 726/1 |
| 2008/0281921 A1* | 11/2008 | Hunt | 709/206 |
| 2009/0043805 A1 | 2/2009 | Masonis et al. | |
| 2009/0044008 A1* | 2/2009 | Lim | 713/156 |
| 2009/0049556 A1* | 2/2009 | Vrielink et al. | 726/26 |
| 2009/0077667 A1* | 3/2009 | Van Rijnsoever et al. | 726/26 |
| 2009/0132811 A1* | 5/2009 | Koster et al. | 713/156 |
| 2009/0144815 A1* | 6/2009 | Vrielink et al. | 726/7 |
| 2009/0307749 A1 | 12/2009 | Lee et al. | |

FOREIGN PATENT DOCUMENTS

| | | |
|---|---|---|
| EP | 1 564 621 A1 | 8/2005 |
| JP | 2003-323343 A | 11/2003 |
| JP | 2004159298 A | 6/2004 |
| JP | 2004260279 A | 9/2004 |
| JP | 2006-120121 A | 5/2006 |
| JP | 2006-174350 A | 6/2006 |
| JP | 2006-254445 A | 9/2006 |
| KR | 1020010106861 A | 12/2001 |
| KR | 1020040000713 A | 1/2004 |
| KR | 10-2004-0055522 A | 6/2004 |
| KR | 10-2005-0045349 A | 5/2005 |
| KR | 1020050101940 A | 10/2005 |
| WO | 9910825 A1 | 3/1999 |
| WO | 99/40517 A1 | 8/1999 |
| WO | 2004/051916 A1 | 6/2004 |
| WO | 2005088896 A1 | 9/2005 |
| WO | WO 2006/064565 A1 | 6/2006 |

OTHER PUBLICATIONS

USPTO Final Office Action dated Jun. 25, 2010 issued in co-pending U.S. Appl. No. 11/829,582.

USPTO Non-Final Office Action dated Oct. 27, 2010 issued in co-pending U.S. Appl. No. 11/829,582.

Communication dated Apr. 19, 2011 from the Japanese Patent Office in counterpart Japanese application No. 2009-529115.

Communication dated Nov. 29, 2011, issued by the Japanese Patent Office in counterpart Japanese Application No. 2009-529117.

Communication dated Jan. 8, 2013, issued by the Japanese Patent Office in counterpart Japanese Application No. 2009-529115.

Hidetoshi, Ueno. "DRM standardization trends in OMA—Technology to achieve rights management and distribution of digital content", NTT DOCOMo Technical Journal, Telecommunications Association, Jan. 1, 2005, vol. 12, No. 4, p. 52-59.

Communication dated Jul. 2, 2013 issued by the Japanese Patent Office in counterpart Japanese Patent Application No. 2009-529115.

* cited by examiner

APPARATUS AND METHOD FOR PROVIDING DOMAIN INFORMATION

CROSS-REFERENCE TO RELATED APPLICATION

This application is based on and claims priority from Korean Patent Application No. 10-2007-0010269 filed on Jan. 31, 2007 in the Korean Intellectual Property Office, and U.S. Provisional Patent Application No. 60/846,105, filed on Sep. 21, 2006 in the United States Patent and Trademark Office, the disclosures of which are incorporated herein in its entirety by reference.

BACKGROUND OF THE INVENTION

1. Field of the Invention

Methods and apparatuses consistent with the present invention relate to an apparatus and method for providing domain information, and more particularly, to providing information about a domain when a device intends to join the domain.

2. Description of the Related Art

CORAL is a technology for improving interoperability between digital rights management (DRM) technologies, and the CORAL consortium was established for this purpose. CORAL is described in more detail at the coral-interop.org website.

Further, the concept of a "domain", which represents a logical set of multiple devices, is presented in CORAL, and there is a domain-management server that manages such a domain. The domain-management server is also called a domain manager. The domain is described in detail in "Core Architecture V3.0" and "Ecosystem V1.0" of the CORAL specification.

The domain-management server manages domains so that each of the devices belongs to a certain domain according to specified rules, and content can be shared between devices belonging to the same domain.

The method involving a device joining a domain is described with reference to FIG. 1 in the following.

First, it is assumed that there is a first device 110 in domain A. If a second device 120 intends to join domain A, the second device 120 connects to a domain-management server 140, receives information about domain A from the domain-management server 140, and sets up the environment using the received information.

Here, the information about domain A includes the type, function, and identification information of the device included in domain A, and can include information about the domain-management server 140 such as the network address (e.g., a Uniform Resource Locator (URL) address) of the domain-management server 140 managing domain A.

Further, the domain-management server 140 can perform the authentication on the second device 120, and a substitute-authentication device 130 can separately exist within domain A. If there is a substitute-authentication device 130, information of domain A can include information of the substitute-authentication device 130 (e.g., the type, function and identification information of the device).

Likewise, according to the related art, in order for a device to join a domain, information about the domain, that is, domain information should be set up, and for this, the device should connect to a separate domain-management server and receive domain information.

However, in order for a user to connect to a domain-management server using a device, the user should directly input the address of the domain-management server using an input means attached to the device, or retrieve the stored address of the domain-management server.

In the case where a device such as a notebook computer or a personal computer has a means for inputting letters, it is easy to connect to the domain-management server, but in the case where the device includes only a four-way key or an inconvenient input means, it is difficult to connect to the domain-management server.

Further, because the device should have a wired or wireless communication function for connecting to the domain-management server, a device having no such function cannot join the domain, which is a problem.

Therefore, there is a need for a method where devices having an inconvenient interface for connecting to a domain-management server or having no wired or wireless internet function can conveniently join a domain.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for setting up domain information after receiving domain information directly transmitted from an existing device without separate communication with a domain-management server.

According to an aspect of the present invention, there is provided an apparatus for providing domain information, the apparatus including a storage module that stores domain information, and a control module that transmits a response message including the stored domain information to the device through the communication-interface module in response to a domain-information-request message received from the device.

According to an aspect of the present invention, there is provided a method of providing domain information, the method including receiving a request message that requests domain information from a device intending to join a domain, generating a response message that includes the stored domain information in response to the request message, and transmitting the generated response message to the device.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Figure 1:
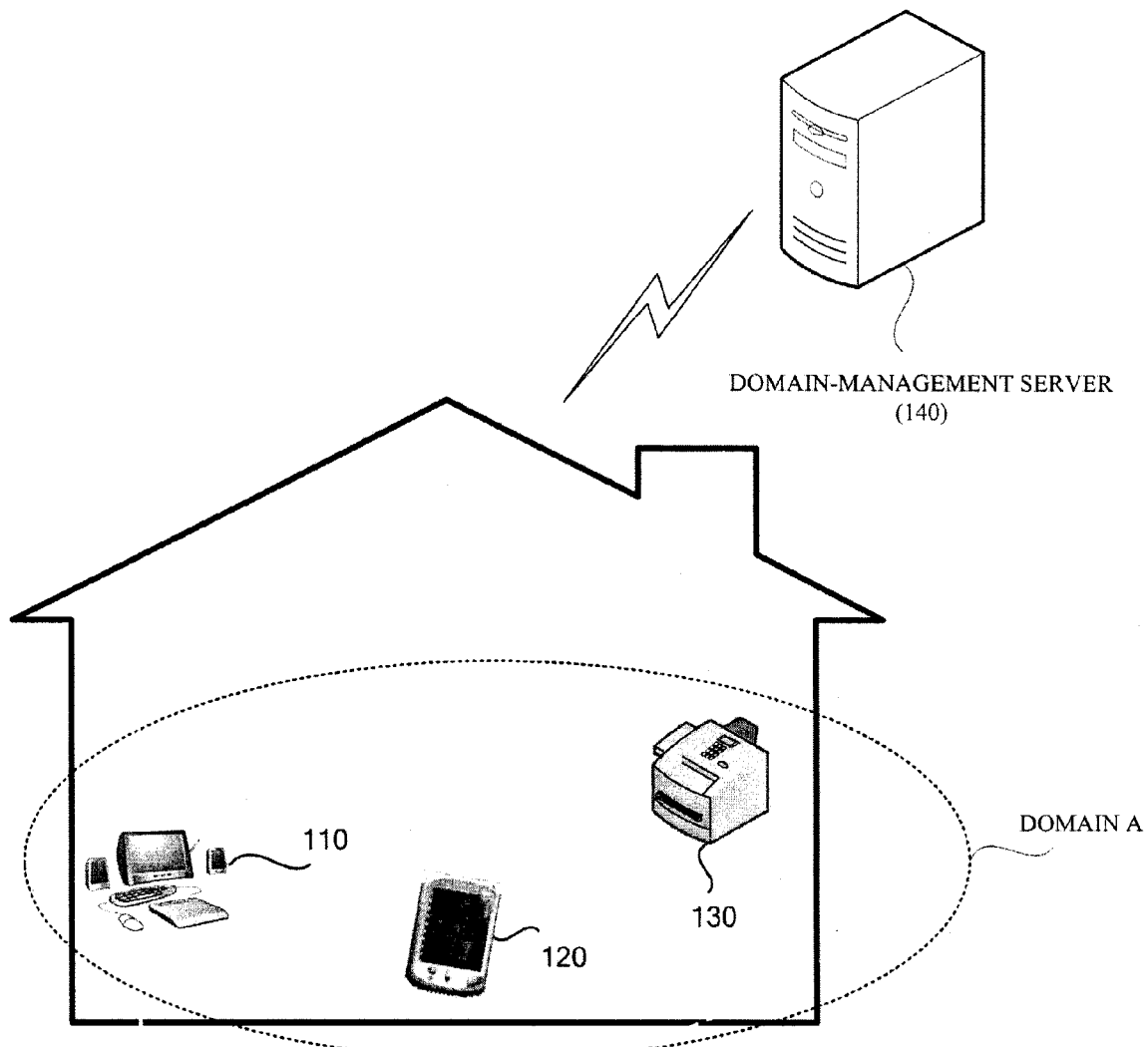
FIG. 1 illustrates a method where a device joins a domain according to CORAL.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
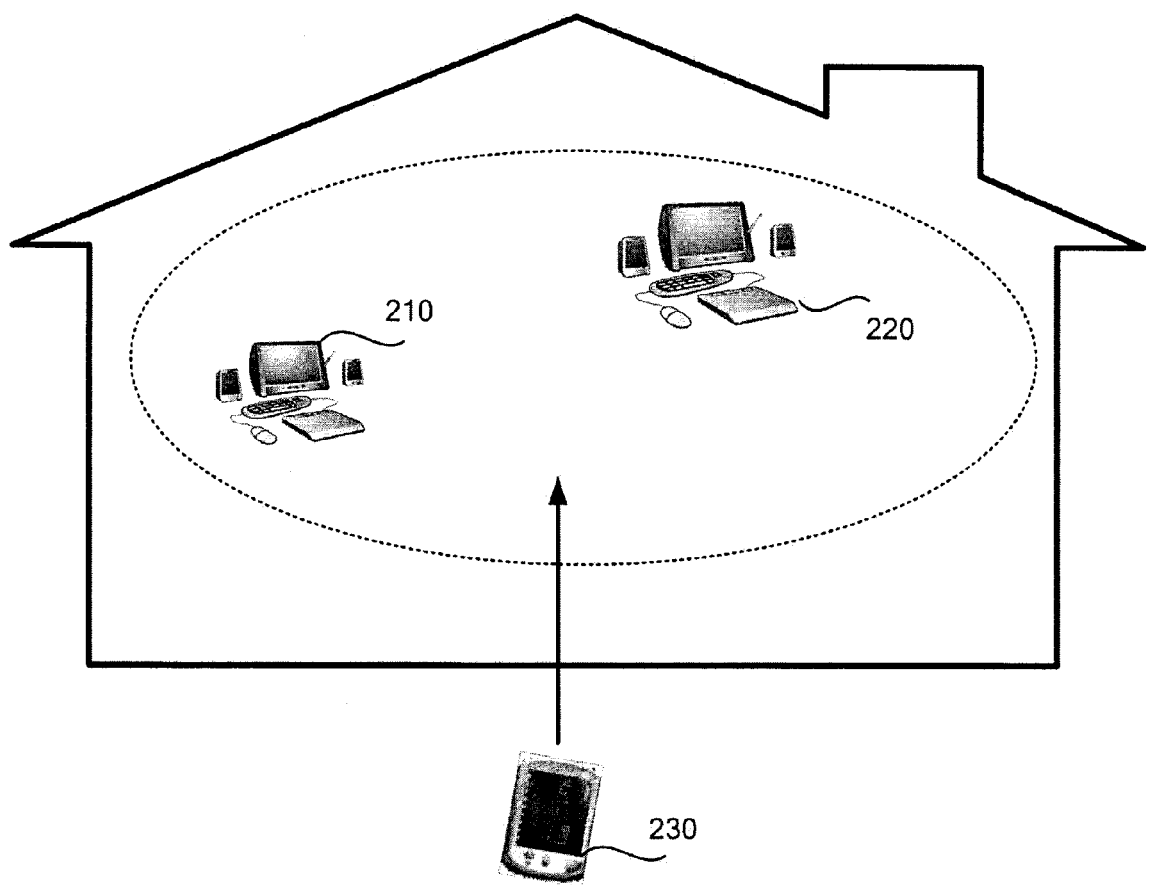
FIG. 2 illustrates a system for providing domain information according to an exemplary embodiment of the present invention.

FIG. 2 illustrates a system for providing domain information according to an exemplary embodiment of the present invention.

Referring to FIG. 2, it is assumed that while a first device 210 and a second device 220 join an arbitrary domain and operate, a user introduces a third device 230, and tries to replay a music file stored in the first device 210 using the third device 230. Further, it is assumed that the first device 210, the second device 220, and the third device 230 support a common communication protocol.

First, the third device 230 broadcasts a message requesting information of devices belonging to the current domain while informing of information about the third device 230, and each of the devices transmits a message including its information, for example, device-identification information or information of provided functions, to the third device 230 in response to the broadcast message. Here, the message broadcast by the third device 230 can include strings indicating that the third device 230 is an element constituting "ecosystem" specified in CORAL, that is, a "specified service model supporting CORAL". That is, the identification information of the ecosystem to which the third device 230 belongs is included in the message, and is broadcast to devices belonging to the current domain.

Likewise, a process where a device intending to join an arbitrary domain informs devices existing in the domain of its existence, and receives information of each of the existing devices in response is called a discovery process. The discovery process can be performed using a mutual-recognition method between devices constituting a communication-network environment specified according to the related art.

Through such a process, the third device 230 obtains information of devices belonging to a domain.

Then, the third device 230 selects a certain device of devices belonging to the current domain, and sends a request for domain information. Here, it is assumed that the third device 230 has selected the first device 210. The user can directly select a device or the third device 230 can arbitrarily select a device.

In response to the request for domain-information, the first device 210 transmits its domain information to the third device 230, the third device 230 sets up the environment for operation within the domain using the transmitted domain information.

That is, the first device 210 that joined a domain provides domain information to the third device 230, and therefore a user does not need to input domain information to the third device 230, and can conveniently set up the domain environment using the domain information received from the first device 210. After the domain environment is appropriately set up, the third device 230 can easily receive domain-related services provided by the domain-management server without additional user input.

In the case where a user directly connects the third device 230 to the first device 210, the aforementioned discovery process can be omitted. Here, the first device 210 can provide its domain information to the third device 230, and the first device 210 informs a domain-management server (not shown) of the fact that the third device 230 has joined the domain. Here, the domain information of the domain-management server (not shown) is updated.

When the domain-environment setup of the third device 230 is completed, the third device 230 can connect to the domain-management server (not shown), and register it in the domain-management server using domain information received from the first device 210. Further, when a new device is registered in the domain-management server, the domain-management server informs all devices belonging to the domain of the registration. In this manner, all devices belonging to the same domain can keep the same domain information.

That is, because it is desirable that the same domain information is set in all devices belonging to the same domain, when there is a change in the domain information, the change is informed to all devices belonging to the domain.

Figure 3:
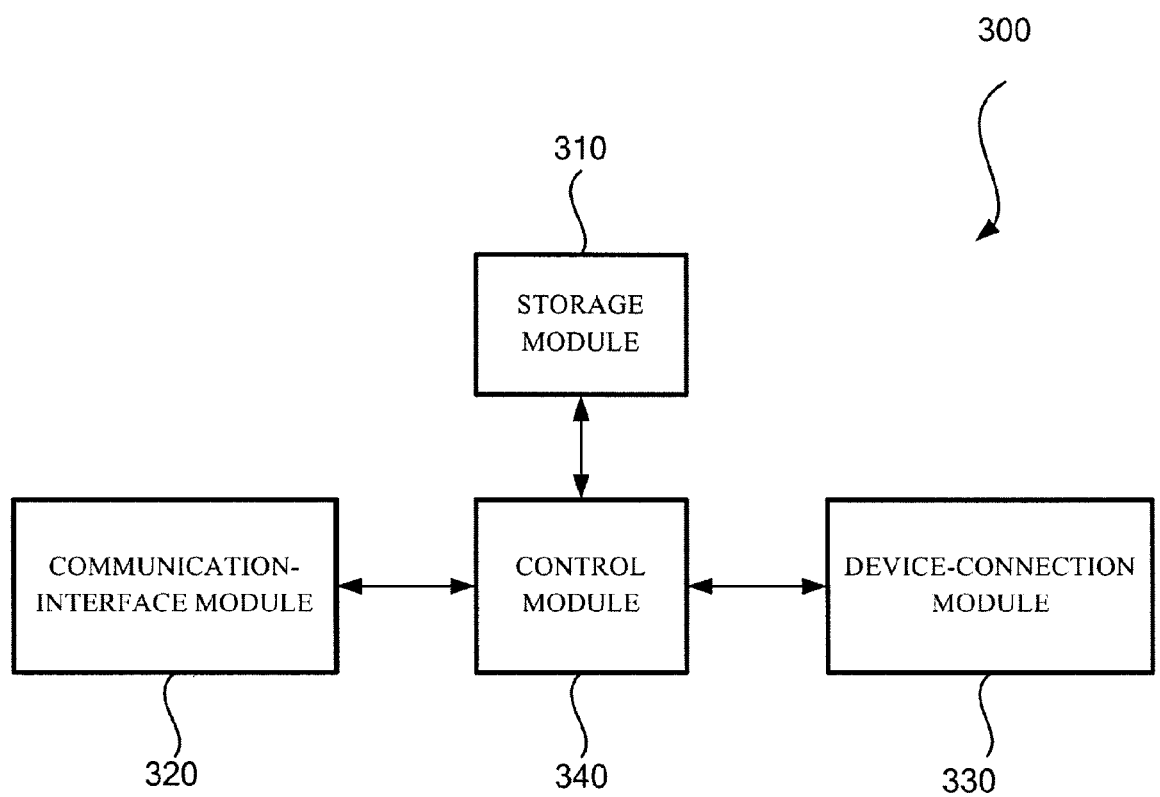
FIG. 3 is a block diagram illustrating the structure of a device for providing domain information according to an exemplary embodiment of the present invention.

FIG. 3 is a block diagram illustrating a device for providing domain information according to an exemplary embodiment of the present invention, and the device 300 illustrated in FIG. 3 is a device that provides domain information, and corresponds to the first device 210 illustrated in FIG. 2.

Referring to FIG. 3, the device 300 for providing domain information includes a storage module 310, a communication-interface module 320, a device-connection module 330, and a control module 340.

The storage module 310 stores domain information, and the stored domain information includes the type, function and identification information of a device included in the domain, and information about a domain-management server like a network address (e.g., an URL) of the domain-management server that manages the domain. Further, the storage module 310 can store information of the device 300.

The communication-interface module 320 communicates with the domain-management server, or communicates with other devices belonging to the domain through a wired or wireless medium. Further, the communication-interface module 320 can communicate with devices intending to join a domain.

The device-connection module 320 is a module that directly connects to other devices, and can be a communication module supporting communication between devices such as a USB communication module or IEEE 1394 communication module.

The control module 340 controls the overall operation of the device 300, and especially extracts domain information stored in the storage module 310 and generates data to transmit the extracted domain information to the device intending to join the domain.

Further, in the case where the domain information is updated, the control module 340 generates a message about the change of the domain information in order to inform other devices belonging to the domain of the update.

The operation between modules constituting the device 300 illustrated in FIG. 3 is described in detail with reference to FIGS. 4 and 5 in the following.

Figure 4:
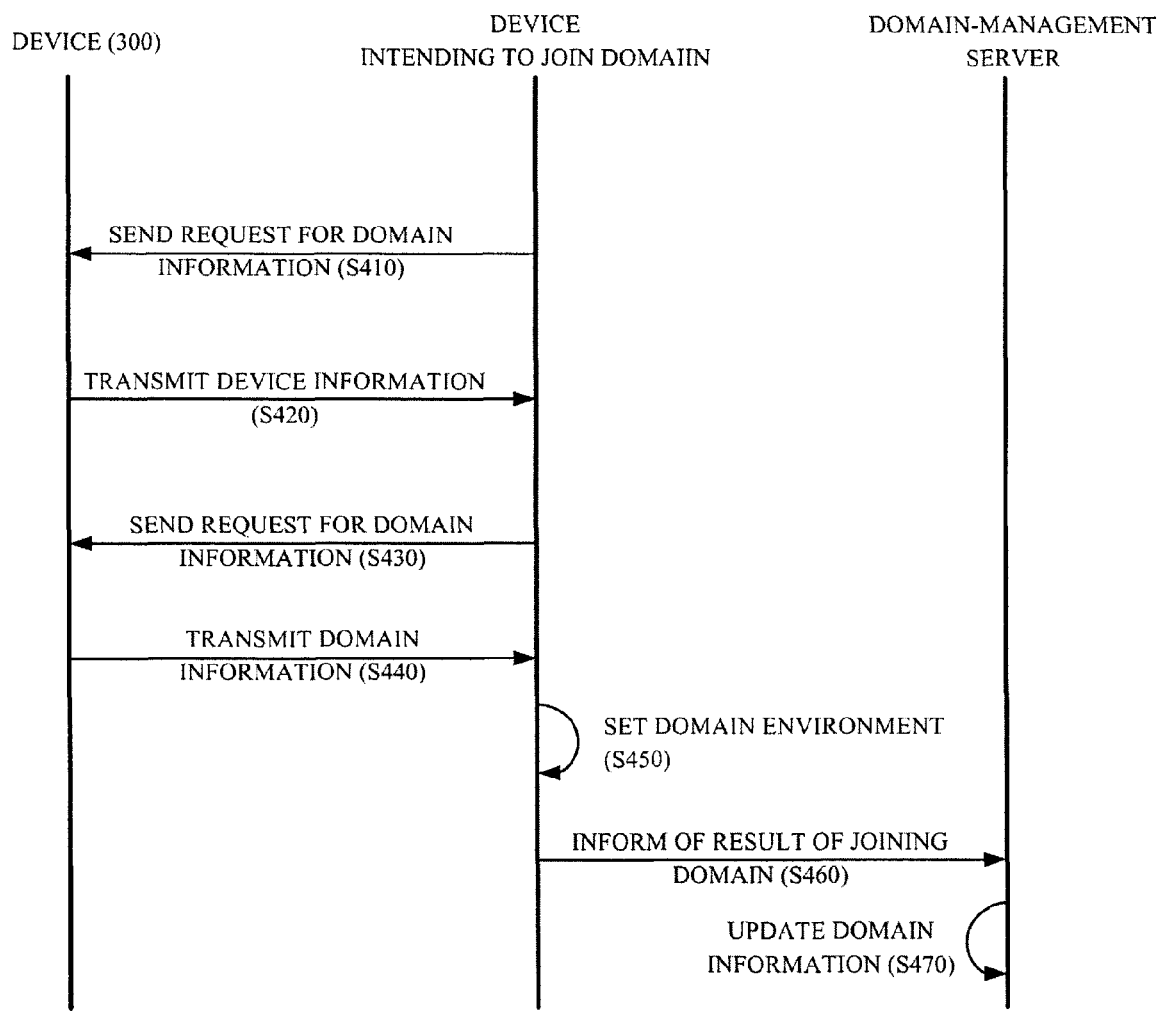
FIG. 4 illustrates a method of providing domain information according to an exemplary embodiment of the present invention.

FIG. 4 illustrates a method of providing domain information according to an exemplary embodiment of the present invention.

First, if the communication-interface module 320 receives a message requesting information of a device 300 from a device with an intention to join a domain while informing of the existence of the device (S410), the control module 340 extracts information of the device 300 from the storage module 310, and transmits the extracted information to the device through the communication-interface module 320 (S420). That is, the aforementioned discovery process is performed.

Here, the message transmitted from the device intending to join can include strings indicating that the device is an element constituting an "ecosystem" specified in CORAL, that is, a "specified service model supporting CORAL". That is, the identification information of the ecosystem can be included in the message and broadcast to devices belonging to the current domain, and FIG. 4 illustrates the case where a certain device 300 receives the broadcast message.

The strings can have the form: "coral-<coralEcosystemName>"

Here, "<coralEcosystemnName>" is identification information of the service model to which the device belongs, and an example of such identification is the name of a service model.

Then, if the device sends a request for domain information to the device 300 (S430), the control module 340 extracts domain information stored in the storage module 310, and transmits the extracted domain information to the device through the communication-interface module 320 (S440).

Here, the message requesting domain information can include the following data structure.

```
<query-configuration-request xmlns="http://www.coral-interop.org/core/2-0">
  <configuration>
    <system-identifier>http://www.samsung.org/wave</system-identifier>
    <manager/>
    <anchor/>
  </configuration>
</query-configuration-request>
```

That is, the message can request information on the domain-management server "<manager/>" and the substitute-authentication device "<anchor/>" as domain information, while providing identification information of the ecosystem in the "<system-identifier>" element.

Likewise, certain domain information can be requested, but in the case where all domain information is requested, only the identification of the ecosystem can be provided, which is described in the following.

```
<query-configuration-request xmlns="http://www.coral-interop.org/core/2-0">
  <configuration>
    <system-identifier>http://www.samsung.org/wave</system-identifier>
  </configuration>
</query-configuration-request>
```

Here, the expression "query-configuration-request" reveals that the message is requesting domain information.

Further, the response message to the message requesting domain information can have the following structure.

```
<query-configuration-response xmlns="http://www.coral-interop.org/core/2-0">
  <configuration>
    <system-identifier>http://www.samsung.org/wave</system-identifier>
    <manager/>
      <service>http://www.samsung.com/wave.domains/k1023</service>
      <account>hskim76</account>
    </manager>
    <anchor>10.88.164.48</anchor>
  </configuration>
</query-configuration-response>
```

That is, the response message indicates identification information of the ecosystem in "<system-identifier>" element, provides the service-connection information "<service>" and the user account "<account>" of the domain-management server "<manager/>" as domain information, and provides device-identification information of the substitute-authentication device "<anchor/>".

Likewise, specified domain information or all domain information can be provided. Another example of domain information is information on domain authentication.

Further, the expression "query-configuration-response" reveals that the message is requesting domain information.

The device intending to join the domain sets up domain environment using the received domain information (S450), connects to the domain-management server (not shown) based on the domain information, and informs the domain of the joining (S460). Here, the domain-management server updates the existing domain information (S470), and broadcast the result of the update to all devices belonging to the current domain. As such, all devices belonging to the domain have the same domain information.

As another example, the domain-environment setup of the device is completed, the device 300 can inform all devices joining the domain and the domain-management server of the fact that a new device belongs to the domain. That is, the device that provides domain information broadcasts the update of the domain information by the device's joining the domain, and therefore the same domain information is kept by all devices within the domain.

Further, the identity of the domain information is kept by devices existing within the domain.

For example, in the case where the domain information of an arbitrary device within the domain has been changed, the device can inform other devices of the change of the domain information by a broadcast.

Likewise, the type attribute for the event that indicates the change of the domain information can be set as "urn:coral:core:4-0:events:configuration-change" in an event message.

Further, the event message can include the new domain information along with the abovementioned event-type setting, which is described in the following.

```
<event type="urn:coral:core:4-0:events:configuration-change">
    <time>2008-12-17T09:30:47</time>
    <event-id xmlns="http://whatever.org/">123</event-id>
    <user-account xmlns="http://whatever.org/">
        <address>http://www.bestshopever.com/users</address>
        <username>homers</username>
    </user-account>
</event>
```

Here, "<time>" refers to the time when an event occurs, and "<event-id>" refers to the type of an event occurred. Further, "123" is the event-identification number for the change of the domain information.

Further, "<user-account>" is an element that informs of the change of the user account, and "<address>" and "<username>" informs of the changed user information.

FIG. 4 illustrates the case where a specified device 300 existing in a domain provides domain information a device intending to join the domain for explanatory convenience, but other devices existing in the domain can provide domain information while the discovery process is performed on the device intending to join the domain.

Figure 5:
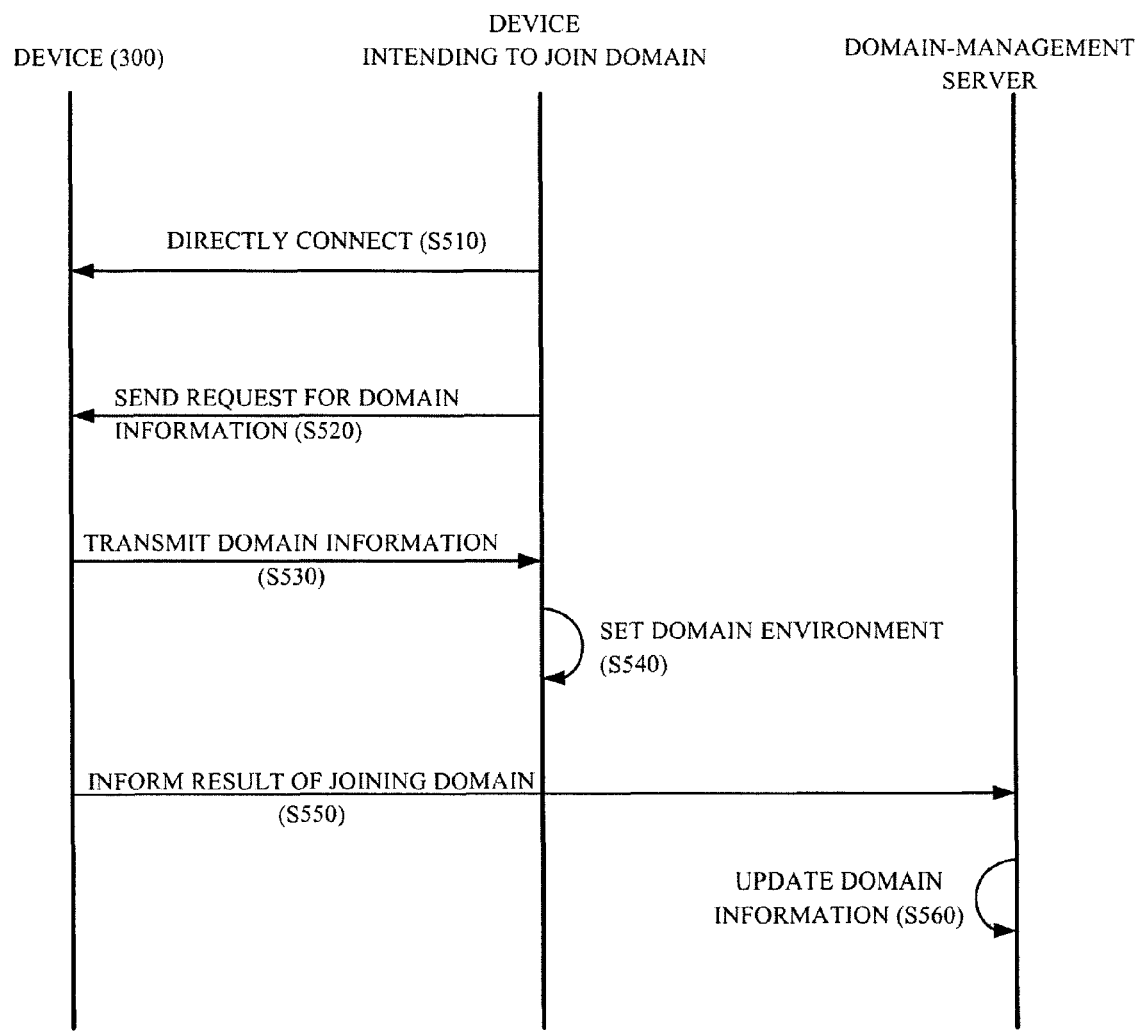
FIG. 5 illustrates a method of providing domain information according to another exemplary embodiment of the present invention.

FIG. 5 illustrates a method of providing domain information according to another exemplary embodiment of the present invention.

First, a user connects a device intending to join a domain to the device-connection module 330 of the device (S510).

Then, if the device sends a request for domain information to the device 300 (S520), the control module 340 extracts domain information stored in the storage module 310, and transmits the extracted domain information to the device through the device-connection module 330 (S530).

The device intending to join the domain sets up domain environment using the received domain information (S540), and the device 300 connects to the domain-management server through the communication-interface module 320, and informs that a new device has joined the domain (S550).

Here, the domain-management server updates the existing domain information (S560), and broadcasts the result of the update to all devices belonging to the current domain. As such, all devices belonging to the domain can keep the same domain information.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to the exemplary embodiments of the present invention, devices can conveniently join a domain.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

What is claimed is:

1. An apparatus for providing domain information, the apparatus comprising:
   a storage module that stores domain information regarding a domain that is managed by the distinct domain-management server, wherein the domain-management server is distinct from the apparatus; and
   a control module that transmits a response message comprising the domain information stored in the storage module to a device through a communication-interface module in response to a domain-information-request message received from the device,
   wherein at least one of the storage module and the control module is implemented as a hardware component,
   wherein the domain information of the response message comprises information on the domain-management server of the domain, and
   wherein the domain-management server provides domain-related services.

2. The apparatus of claim 1, wherein the domain-information-request message comprises identification information indicating a service model provided by the domain.

3. The apparatus of claim 2, wherein the domain-information-request message further comprises request information of the domain-management server that manages the domain.

4. The apparatus of claim 2, wherein the domain-information-request message further comprises request information of a substitute-authentication device.

5. The apparatus of claim 1, wherein the information on the domain-management server comprises service-connection information on the domain-management server.

6. The apparatus of claim 1, wherein information on the domain-management server comprises user-account information.

7. The apparatus of claim 1, wherein the domain information of the response message comprises information on a substitute-authentication device.

8. The apparatus of claim 7, wherein information on the substitute-authentication device comprises device-identification information of the substitute-authentication device.

9. A method of providing domain information, the method comprising:
- receiving, by a domain-information-providing device, a request message that requests domain information from a device intending to join a domain managed by a domain-management server, wherein the domain-management server is distinct from the domain-information-providing device;
- generating, by the domain-information-providing device, a response message comprising the domain information in response to the request message; and
- transmitting, by the domain-information-providing device, the response message to the device,
- wherein the domain information of the response message comprises information on the domain-management server that manages the domain, and
- wherein the domain-management server provides domain-related services.

10. The method of claim 9, wherein the request message comprises identification information indicating a service model provided by the domain.

11. The method of claim 10, wherein the request message further comprises request information of the domain-management server that manages the domain.

12. The method of claim 10, wherein the request message further comprises request information of a substitute-authentication device.

13. The method of claim 9, wherein the information on the domain-management server comprises service-connection information of the domain-management server.

14. The method of claim 9, wherein the information on the domain-management server comprises user-account information.

15. The method of claim 9, wherein the domain information of the response message comprises information on a substitute-authentication device.

16. The method of claim 15, wherein the information on the substitute-authentication device comprises device-identification information of the substitute-authentication device.

17. The method of claim 9, further comprising:
- receiving, by the device, the response message comprising the domain information from the domain-information-providing device;
- joining, by the device, the domain using the domain information;
- transmitting, by the device or the domain-information-providing device, a message informing that the device has joined the domain to the domain-management server; and
- updating, by the domain-management server, device information for the domain according to the message informing that the device has joined the domain.

18. The apparatus of claim 1, wherein the domain is centrally managed by the domain-management-server that stores and updates device information regarding devices that have joined the domain.

* * * * *